T. O'CONNELL.
BOILER STAND.
APPLICATION FILED MAY 1, 1911.
1,075,990.
Patented Oct. 14, 1913.
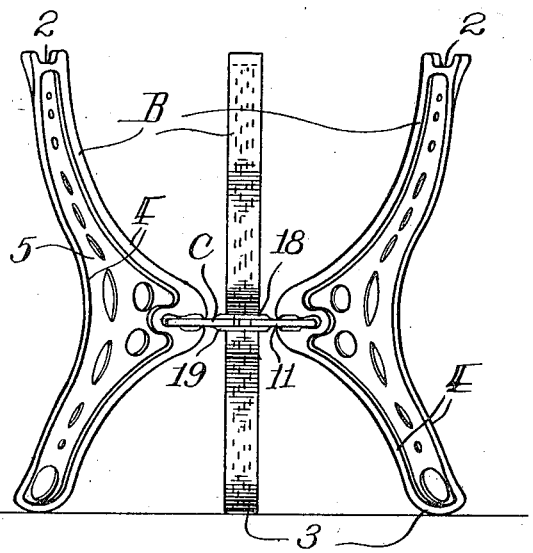
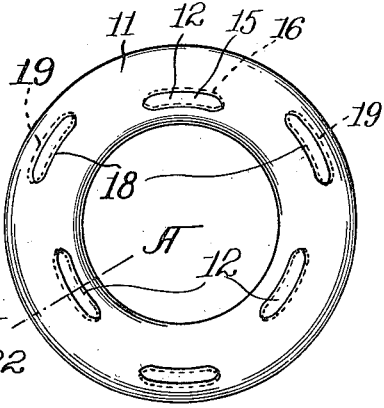
Witnesses:
Paul S. Smith
H. Fischer
Inventor:
Thomas O'Connell,
by: [signature]
Attorney.

UNITED STATES PATENT OFFICE.

THOMAS O'CONNELL, OF ST. PAUL, MINNESOTA.

BOILER-STAND.

1,075,990.

Specification of Letters Patent.   Patented Oct. 14, 1913.

Application filed May 1, 1911.   Serial No. 624,448.

*To all whom it may concern:*

Be it known that I, THOMAS O'CONNELL, a citizen of the United States, residing at St. Paul, in the county of Ramsey and State of Minnesota, have invented a new and useful Improvement in Boiler-Stands, of which the following is a specification.

My invention relates to improvements in boiler stands for hot water boilers and its object is to provide a stand which may be readily assembled to receive a boiler and which may be readily adjusted to be used in connection with the different sizes of standard boilers. I have secured these results in a device which is very simple in construction and has no bolts, screws nor loose adjustable parts to become lost or out of order.

In the drawings with which I have illustrated my device and which form part of my specification, Figure 1 is an elevation of my boiler stand; Fig. 2 is a plan of the connector ring; Fig. 3 is a section of the ring on the line A—A of Fig. 2; Fig. 4 illustrates a similar section with the ring reversed; Fig. 5 illustrates the position of the legs when used in connection with the ring in the position shown in Figs. 3 and 4 for adjustment, and Fig. 6 illustrates an alternative construction of the connector ring.

In the above drawings I have shown a boiler stand made up of three legs B and a connector C joining the legs and holding them in position as illustrated in Fig. 1. Each leg B is formed of convenient shape having an upper extremity notched at the point 2 to receive the rim of a hot water boiler, while the lower extremity of the leg has a partly rounded surface 3 allowing the angular positioning of the leg adjusting it to different sizes of boilers without presenting a sharp corner on the support.

A rim 4 and apertured web 5 allow a strong light construction of the leg. On its inner side the leg is formed with a recess 6 between the lugs 7 and 8. Within the recess 6 in its sides are engaging notches 9 and 10. The lugs 7 and 8 are reinforced laterally about the notches 9 and 10 to give them greater bearing surface and each is substantially in the form of a longitudinally disposed hook.

The connector C as illustrated has the form of a flat ring 11 having oblong lugs 12 formed integral with its upper and lower surfaces. In the form illustrated in Fig. 2 the lugs 12 are cast integral with the body 11 of the ring in an arc concentric with the ring. Each lug has slightly sloping sides 13 which taper toward one end of the lug and a flat top 14 to give close engagement to the corresponding parts of the notches 9 and 10 of the legs B. A pair of lugs is provided for the attachment of each leg B in its normal position. One lug 15 being on top of the body 11 of the ring and the other lug 16 similar in shape lying upon the opposite side of the ring and slightly outside of the upper lug 15.

The recess 6 in the legs B has a width sufficient to slip over the body 11 of the ring allowing the notches 9 and 10 to be brought into a position to slip over the lugs 15 and 16 in the position shown in Fig. 3 where they are rigidly engaged by the slight taper of the lugs, thus holding the legs B in firm connection with the connector C. Three pairs of lugs 15 and 16 are provided on the ring 11 allowing the positioning of the three legs B to form a stand of the form shown in Fig. 1 which is accommodated to the smallest size of boiler to which the stand is adjustable. By turning the ring 11 over, the lugs 16 lie upon its upper surface as shown in Fig. 4 in position to engage the notch 9 when the lug 15 lying below the lug 16 engages the notch 10. This reversal of the lugs in the notches 9 and 10 throws the notch 10 to a position on the lug 15 causing the rotation of the leg B to the position 17 shown in dotted lines in Fig. 5.

It is evident that the movement of the upper notch 2 outwardly from the center of the rim on each of the legs will increase the boiler diameter which the stand is fitted to carry, thus accommodating the stand to two sizes of boilers.

In Fig. 2 I have illustrated lugs 18 and 19 similar in form to lugs 15 and 16 but positioned near the outer circumference of the ring 11 thus locating the leg B upon a circle of greater diameter. This diameter may be made such that in the normal position of the ring 11 a larger sized boiler will be accommodated by the stand than in the reversed position of the ring when using the lugs 15 and 16. The lugs 18 and 19 are formed with the lower lugs 19 extending slightly beyond the lugs 18 as shown in Fig. 2 and by reversing the ring 11 the legs may be rotated from their normal position as illustrated in Fig. 5 again increasing the diameter of the boiler which may be accommodated.

It is evident that the number of different sizes to which my form of stand may be adjusted is limited only by the number of pairs of lugs which may be placed upon the ring 11 and that this number of lugs may be increased by increasing the relative diameter of the ring. For ordinary commercial purposes the adjustment to four sizes of boilers is sufficient and may be efficiently secured by a connector and leg having the proportions shown by which a light rigid stand is secured having great rigidity and strength.

In Fig. 6 I have illustrated an alternative form of engaging lug 21 which is placed upon the ring 11 in a spiral position. The opposite lug 22 of the pair is formed with a spiral in the opposite direction intersecting the line of the lug 21 near its middle point. The position of the legs B having their notches engaging the lugs 21 and 22 is changed by moving the legs along the lugs 21 and 22 thus causing the engaging notches 9 and 10 to assume different relative position laterally.

The form of connector ring C may be varied, the essential feature being a pair of engaging faces or lugs to which are fitted corresponding grooves or notches in the leg parts of the stand in such a manner as to produce a rigid stand. The same result may be secured by using a ring having segments formed at an angle to the plane of the ring whereby the leg parts sliding upon the lugs will be rotated when moved from one segment to another of the rings. The design of the parts of this invention and particularly although not exclusively the ring permits of stamping which is a material advantage in the fabrication of the parts in commercial practice.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A boiler stand comprising a plurality of legs each having upper and lower engaging notches in fixed position and opposed to each other, and a connector having upper and lower lugs adapted to engage said notches on said leg to fix them rigidly, said lugs being positioned to adjust said legs to one size of boiler in one position of said connector and to another size of boiler in the reversed position of said connector.

2. A boiler stand comprising a plurality of leg parts in fixed position thereon having engaging notches, a connector ring adapted to carry said leg parts and having a pair of integral lugs disposed on opposite sides of said ring at different distances from the center of said stand to engage each of said leg parts to hold it in one position in the normal position of said ring and in another position in a reversed position of said ring.

In testimony whereof, I have signed my name to this specification in the presence of two subscribing witnesses.

THOMAS O'CONNELL.

Witnesses:
H. L. FISCHER,
F. G. BRADBURY.

---

Copies of this patent may be obtained for five cents each, by addressing the "Commissioner of Patents, Washington, D. C."